United States Patent Office 3,248,224
Patented Apr. 26, 1966

3,248,224
LIQUID RUMINANT SUPPLEMENT
Richard I. Loomis, San Luis Obispo, and John W. Algeo, Santa Ynez, Calif., assignors to Loomix, Inc., San Luis Obispo, Calif., a corporation of California
No Drawing. Filed May 15, 1962, Ser. No. 194,956
2 Claims. (Cl. 99—2)

The invention, in general, relates to the care and feeding of ruminant animals. More particularly, the invention relates to a liquid ruminant food supplement of variably controlled palatability and nutritional value as well as of therapeutic use as a vehicle for the medication of livestock in pasture or in large feed yards.

While our product is entirely suitable as a food supplement for cattle and sheep while grazing in normal areas of natural food supply, it has especial efficacy for the feeding and medication of animals kept under marginal or deficient feed conditions such as in appreciably cold areas or under grazing conditions where the rangelands are inaccessible for normal food supplementation and where the available feed comprises such dry range grasses as dry barley, wheat or oat stubble or similar dry forage.

It is perhaps well known that it has long been the practice to feed molasses ad libitum to cattle and sheep as an energy source. Whether fed by itself or in combination with other ingredients the supplement molasses is disadvantageous because of the difficulty in maintaining or controlling the supplemental feed intake to desired levels of from approximately 2 to 4 pounds of the supplement per head daily due to the high palatability of the molasses. That is to say, like candy to children the molasses tastes so good that cattle will over-eat to their detriment. This is especially true where native feeds are in short supply, it being well established that the consumption of molasses by cattle will increase considerably under these conditions which is not only undesirable but also uneconomical. The present invention is directed to the provision of an improved liquid ruminant supplement which obviates all of the disadvantages of prior livestock supplements and which can be so regulated or controlled as to proportions of ingredients that the intake thereof can be controlled between desired levels per head per day with the added factor that our unique supplement can be used effectively and economically under adverse conditions, heretofore precluded as to most prior supplements, such as in appreciably cold regions.

A primary object of our present invention is to provide a liquid ruminant supplement, readily varied, for controlling the ad libitum intake of protein, energy vitamin A, and phosphorus, as well as drugs when necessary, and wherein a relatively unpalatable substance constitutes the primary ingredient vehicle rather than a more highly palatable substance, such as molasses.

Another important object of the invention is to provide a liquid ruminant supplement of the indicated nature which is especially characterized by its facility for variation in palatability.

A still further object of the present invention is to provide an improved liquid ruminant supplement of the aforementioned character which is ever available under variable climatic conditions and which is not subject to freezing in appreciably cold areas.

Another important object of our invention is to provide a liquid ruminant supplement capable of use as a carrier of drugs for the mass oral medication of cattle in pastures and in large feed yards.

Other objects of the invention, together with some of the advantageous features thereof, will appear from the following description of exemplifications of a preferred embodiment and certain modified embodiments of our invention. It is to be understood, however, that we are not to be limited to the precise embodiments described, nor to the precise components thereof or order of steps described and employed in compounding the compositions, as our invention, as defined in the appended claims, can be embodied in a plurality and variety of forms.

In its preferred form, the liquid ruminant supplement of our present invention preferably comprises as a first exemplification an aqueous solution of condensed beet solubles, molasses and urea solutions, together with vitamin A stabilized against oxidation. Another exemplification of the preferred embodiment of our invention comprises the foregoing solution with added diammonium phosphate but with a reduced amount of molasses. A still further exemplification of the preferred embodiment of the invention which is efficacious in cold climates, comprises the first above mentioned ingredients in aqueous solution but with reduced amounts of both condensed beet solubles product and molasses and containing, in addition, diammonium phosphate and propylene-glycol.

As modified embodiments of our improved liquid ruminant supplement, especially suitable for cold climates, we provide an aqueous solution of condensed beet solubles containing molasses in approximately one-half of the amount of the condensed beet solubles present, and also containing urea solution, propylene-glycol, together with oxidative stabilized vitamin A. Or, the aforesaid modified embodiment of an aqueous solution wherein the ratio of contained condensed beet solubles to contained molasses is approximately 6 to 1 and the solution also contains diammonium phosphate in an amount approximately 4/5 of the propylene-glycol present.

While the exemplifications of the preferred embodiment as well as the exemplifications of our modified embodiments, hereinabove delineated preferably all contain the same amount of stabilized vitamin A, which in all cases preferably is in an amount approximating 5,000 international units per pound of the supplement, we also provide a still further modification of our improved liquid ruminant supplement wherein the quantity of vitamin A contained therein is appreciably increased in each exemplification. The high level vitamin A modification of our invention is for application to cattle feeding on range lands which are inaccessible for normal supplementation practices, and its use insures liver storage in the ruminants of adequate amounts of vitamin A so as to make it unnecessary for further supplementation of vitamin for up to 90 days in the case of cows and bulls and from 45–60 days in the case of young growing cattle. This high level vitamin A content of our modified embodiment of the various exemplifications of the delineated supplements is fed for two or three days and then one or another of the aforesaid exemplifications substituted therefore depending upon the locality of the cattle, whether in areas of cold or warm climates and whether the available feed is natural and plentiful grasses or is dry rangeland stubble or the like.

Any one of the aforesaid exemplifications can be employed in still another modified form in caring for cattle bearing a disease of one kind or another, in which modification the supplement acts as a vehicle for conveying a prescribed drug for oral medication. This therapeutic modification of our improved supplement affords the mass treatment of livestock in pastures and avoids the necessity for rounding up large herds of cattle and sheep in order to administer such drugs as antibiotics, sulfonamides and organic phosphate type anthelmintics, where prescribed. Moreover, the medicated modified form of our improved supplement may be readily mixed with feeds in large feed yards for therapeutic treatment of cattle having certain diseases. It may be added that the overall palatable flavor of the modified supplement containing a prescribed drug masks the somewhat disagreeable flavor of most drugs thus assuring that the cattle will accept the same and obtain proper therapeutic or preventive dose intakes. Moreover, it is possible to tailor the amounts of the ingredients of our improved supplement to drug levels as prescribed by the veterinarian. Thus saving hours of time in the treatment and handling of cattle. Naturally, an important consideration of using our supplement as a vehicle for oral administration of drugs is that the stresses normally involved in handling animals at a critical time of the onset of a disease outbreak is appreciably lessened. Water soluble forms of all veterinary drugs may easily be administered with any one of the delineated exemplifications of our preferred and modified embodiments of the improved liquid ruminant supplement for the treatment and prevention of such cattle diseases as anaplasmosis, leptospirosis, pneumonia, hemorrhagic septicimia, coccidiosis, root rot, internal parasites, cattle grub, and ectoparasites such as lice and ticks.

The internal and blood sucking external parasites are usually treated with water soluble organic phosphates, such as "Trolene" and "Ruelene," under drug levels prescribed and recommended for these and the other mentioned diseases by any registered and practicing veterinarian, which can readily be incorporated in aqueous solution form in our supplement. Such drugs as oxytetracycline, sold under the trademark "Terramycin," tetracycline, chlorotetracycline, sold as "Aureomycin," penicillin-G, and dihydrostreptomycin as well as such sulfa drugs as sulfa methazine, sulfa pyridine, sulfa merazine, sulfa thiazole and sulfa quinoxaline may readily be introduced into our liquid ruminant supplement for range animals at the levels prescribed by the veterinarian treating the disease of the livestock. In feed yards, the feed mill operator can apply the drugs as prescribed, to our improved preferred and modified embodiments at the levels prescribed.

A primary ingredient of our compositions, which as entireties may conveniently be made up in batches of 1000 gallons, comprises condensed beet solubles, which is the principal carrier of the mixtures. By condensed beet solubles, we mean the residual product obtained by the partial removal of glutamic acid from the filtrate resulting from the Steffens process of recovering sugar from beet molasses; the Steffens process being well known in the art. The residual product of the Steffens process of recovering sugar from cane molasses can be used with equal effectiveness. Or, it is possible to employ the filtrate of the Steffens process without removal of the glutamic acid. Condensed beet solubles, unlike cane, corn or beet molasses, is an unpalatable liquid and by altering the level of the condensed beet solubles in the exemplifications hereinabove delineated, we are able to control consumption of the supplement which otherwise would fluctuate considerably in relation to the availability of dry range grasses or other forages.

The following examples typify the preparation of our improved liquid ruminant supplement, the percentages being approximately the relative proportions of the ingredients by weight to the total weight of the supplement, and the various examples illustrate the shiftable palatability of the supplement to meet rangeland grazing conditions:

*Example 1*

| | Percent |
|---|---|
| Condensed beet soluble | 65.000 |
| Molasses (beet or cane) | 28.976 |
| Urea solution (20% N) | 6.000 |
| Vitamin A (stabilized) | 0.024 | wherein the 20% nitrogen urea solution comprises pure crystalline urea dissolved in water, and the vitamin A has been stabilized against oxidation for periods approximating 60 days by an aqueous mixture of anti-oxidants, such as the product sold commercially under the trademark "Lequivite." The formulation of Example 1 is efficacious as a liquid ruminant supplement where cattle or sheep are grazing in relatively mild or warm climates and native grasses are reasonably plentiful. This formulation affords approximately 23% of crude protein and supplies approximately 39% of net energy as well as approximately 5000 international units of vitamin A per pound of supplement intake.

*Example 2*

| | Percent |
|---|---|
| Condensed beet solubles | 65.000 |
| Molasses (beet or cane) | 21.976 |
| Urea solution (20% N) | 1.000 |
| Diammonium phosphate solution (50%) | 12.000 |
| Vitamin A (stabilized) | 0.024 | wherein the quantity of condensed beet solubles and vitamin A are the same as in Example 1, and wherein diammonium phosphate solution is added to replace reduced quantities of molasses and urea solution. The urea solution, taken with the diammonium phosphate solution provide non-protein nitrogen sources of readily available nitrogen for microbial metabolism, which is highly advantageous and valuable in a diet for ruminants, while the condensed beet solubles supply both true protein and non-protein nitrogen containing compounds. This combination of condensed beet solubles and diammonium phosphate solution is unique in ruminant supplements and appreciably advantageous since both required nitrogen forms are present, which eliminates the necessity of feeding expensive, hard to handle dry supplements such as cottonseed oil meal, or soybean oil meal or linseed oil meal in order to obtain true protein. The formulation of Example 2 is especially efficacious where animals graze during relatively mild weather on rangelands of dry grasses and other dry forage which are phosphorous deficient, such deficiency supplying not only phosphorous but also a portion of the non-protein nitrogen containing compounds. The percentage of crude protein, net energy and vitamin A is approximately the same as Example 1.

*Example 3*

| | Percent |
|---|---|
| Condensed beet solubles | 49.000 |
| Molasses (cane or beet) | 21.976 |
| Urea solution (20% N) | 2.000 |
| Diammonium phosphate solution (50%) | 12.000 |
| Propylene glycol | 15.000 |
| Vitamin A (stabilized) | 0.024 | wherein the amount of condensed beet solubles is appreciably reduced or adjusted in its relation to molasses, from the formulations of Examples 1 and 2, and the chemical compound propylene glycol has been added. The formulation of Example 3 is a relatively fine liquid ruminant supplement for cattle grazing on rangelands of dry oat or wheat stubble and the like, or other dry forages, in appreciably cold regions. The propylene glycol present prevents the supplement from freezing and thereby provides a supplement which cattle will accept; it being well established that cattle will not consume an appreciable level of supplemental feed in the frozen state. The inclusion of the propylene glycol has a two fold purpose. First, because of its very low freezing point it serves as an anti-freezing agent, second, propylene glycol readily converts by rumen microorganisms into propionic acid which is a primary energy source for ruminant animals. Hence, while the percentage of intake of crude protein in this formulation is about the same as in Examples 1 and 2, the supply of net energy is close to 60% per pound of intake by reason of the additional energy supplied by the propylene glycol, which is highly advantageous for cattle feeding in extremely cold areas. The presence of diammonium phosphate solution in this formulation also lends to its high effectiveness as a liquid ruminant supplement in cold region.

Example 4

| | Percent |
|---|---|
| Condensed beet solubles | 50.000 |
| Molasses (cane or beet) | 26.976 |
| Urea solution (20% N) | 8.000 |
| Propylene-glycol | 15.000 |
| Vitamin A (stabilized) | 0.024 | wherein the amount of molasses and of urea solution have been increased for the removal of the diammonium phosphate solution which is not necessary if the grazing of the cattle in a cold region is on native grasses not deficient in phosphorous.

Example 5

| | Percent |
|---|---|
| Condensed beet solubles | 61.000 |
| Molasses (beet or cane) | 10.000 |
| Urea solution (20% N) | 1.000 |
| Diammonium phosphate solution (50%) | 12.000 |
| Propylene-glycol | 15.000 |
| Vitamin A (stabilized) | 0.024 | wherein the ratio between the condensed beet solubles and the molasses has been increased by altering or shifting the palatability of the supplement and bringing the intake to proper and economical levels. The formulation of Example 5 is highly efficacious for supplement intake for cattle grazing in cold regions on rangeland of dry grasses or other dry forage and in situations where the previous supplement intake has been above satisfactory level because of the high molasses content of the supplement. This formulation is a balancer to bring the diet of supplement to desired level of intake. The same quantity of propylene-glycol and vitamin A are present as in the case of Examples 3, 4 and 5 which is requisite for increased supply of energy while cattle are grazing in appreciably cold areas.

Any one of the exemplifications of our invention, whether supplied during mild climates or extremely cold or freezing temperatures, is an excellent vehicle for such micronutrients as vitamin A as indicated by the examples hereinbefore delineated. Being such an excellent vehicle, the amount of vitamin A contained in the supplement can be readily adjusted to desired levels, such as supplying this micronutrient to cattle in amounts ranging between 5000 and 15,000 international units per animal daily and from 500 to 1,500 international units in sheep rations. These levels are more than adequate to meet the growth and production requirements of ruminants. Also, it aids in the prevention of certain diseases, such as pink eye and respiratory infections. In addition to the supplements indicated, we have found that is possible to feed appreciably high levels of vitamin A for one or two days and thus increase the liver storage thereof to a point where further supplementation is unnecessary for approximately 3 months in the case of cows and bulls and up to 45–60 days in the case of young growing cattle. This modified embodiment of our invention is especially applicable for cattle sent to rangelands which are inaccessible for normal supplementation through normal servicing practices where feed and grazing conditions are daily watched, and will insure storage of adequate amounts of vitamin until the cattle are returned to accessible grazing lands. Moreover, this modified embodiment is efficacious in mass medication of large herds with vitamin A where indicated. Effective dose levels for this medication type of administration are preferably 500,000 to 1,000,000 international units for young cattle and calves, and 1,500,000 to 2,000,000 international units of vitamin A for adult animals. These levels are reduced by approximately a factor of 10 for administration in sheep. Naturally, when the modified embodiment of our liquid ruminant supplement containing high levels of vitamin A are fed to cattle or sheep, the supplements hereinabove delineated are not employed until a subsequent time or until the vitamin A portion has completed its function and the need for additional international units of vitamin A is indicated at lower levels thereof.

As indicated above, any prescribed drug can be incorporated in aqueous solution with the ingredients of any exemplification of our preferred and modified embodiments of our invention for combatting any given cattle or sheep disease and pursuant to the specifications of an authorized licensed veterinarian. In this way, as with cattle or sheep having no disease, servicing of a cattle or sheep ranch can be accomplished readily and daily, if required, to meet varying conditions of normal feeding on native grasses and to shift the palatability of the supplement to maintain intake levels at proper and economic levels, as hereinabove described.

It is to be understood that the appended claims are to be accorded a range of equivalents commensurate in scope with the advances made over the prior art.

We claim:

1. A method of controlling the ad libitum intake of a food supplement by ruminants under grazing conditions where native grasses and other forage are reasonably plentiful, said method comprising feeding to ruminants a liquid solution comprising 65% by weight of condensed beet solubles, 29% by weight of molasses, and 6% by weight of 20% N pure crystalline urea dissolved in water.

2. A method of controlling the ad libitum intake of a food supplement by ruminants under grazing conditions where only dry grasses, dry stubble and other dry forage are present; said method comprising feeding to ruminants a liquid solution comprising 65% by weight of condensed beet solubles, 22% by weight of molasses, 1% by weight of 20% N pure crystalline urea dissolved in water, and 12% by weight of a 50% concentration of diammonium phosphate in water.

References Cited by the Examiner

UNITED STATES PATENTS

| Re. 24,707 | 9/1959 | Gillis | 99—2 |
| 2,535,117 | 12/1950 | Bennett. | |
| 2,748,001 | 5/1956 | Anderson et al. | 99—6 |
| 2,807,546 | 9/1957 | Anderson et al. | 99—6 |
| 2,808,332 | 10/1957 | Anderson et al. | 99—6 |
| 3,020,157 | 2/1962 | Fetzer | 99—6 X |

FOREIGN PATENTS

| 10,215 | 1904 | Great Britain. |

A. LOUIS MONACELL, *Primary Examiner.*